United States Patent
Swingley

(10) Patent No.: US 9,611,960 B2
(45) Date of Patent: Apr. 4, 2017

(54) CUT-IN FITTING FOR CONNECTING PIPE

(71) Applicant: Spears Manufacturing Co., Sylmar, CA (US)

(72) Inventor: Douglas Swingley, Santa Clarita, CA (US)

(73) Assignee: Spears Manufacturing Co., Sylmar, CA (US)

( * ) Notice: Subject to any disclaimer, the term of this patent is extended or adjusted under 35 U.S.C. 154(b) by 846 days.

(21) Appl. No.: 13/780,498

(22) Filed: Feb. 28, 2013

(65) Prior Publication Data

US 2014/0239633 A1   Aug. 28, 2014

(51) Int. Cl.
*F16L 23/028* (2006.01)
*F16L 23/00* (2006.01)

(52) U.S. Cl.
CPC ......... *F16L 23/0286* (2013.01); *F16L 23/003* (2013.01); *Y10T 29/49732* (2015.01)

(58) Field of Classification Search
CPC ..... F16L 23/0286; F16L 23/003; F16L 23/02; F16L 23/18; F16L 23/024
USPC ................... 285/407, 406, 412, 415
See application file for complete search history.

(56) References Cited

U.S. PATENT DOCUMENTS

| | | | | |
|---|---|---|---|---|
| 5,437,482 A * | 8/1995 | Curtis | ................ | F16L 23/028 285/148.13 |
| 6,015,170 A * | 1/2000 | Carpenter | ............... | F16L 23/00 285/223 |
| 7,114,752 B2 * | 10/2006 | Voelker | ................ | F16L 27/12 285/302 |
| 2005/0052026 A1 * | 3/2005 | Hayashi | ................ | F16L 23/032 285/415 |
| 2005/0225089 A1 * | 10/2005 | Ben-Horin | .......... | F16L 23/0286 285/414 |

OTHER PUBLICATIONS

"Interlock INT-1100 1 in. Slip Pipe-Fix PVC Repair Coupling". SprinklerWarehouse Web. (Publication, date unknown); <http://www.sprinklerwarehouse.com/Interlock-Irrigation-PVC-Repair-Fittings-p/int-1100.htm>, May 31, 2013, 3:51:00 PM.

* cited by examiner

*Primary Examiner* — Daniel P Stodola
*Assistant Examiner* — Zachary Dragicevich
(74) *Attorney, Agent, or Firm* — Jeffrey G. Sheldon; Leech Tishman; Fuscaldo & Lampl

(57) ABSTRACT

A cut-in fitting has a flange hub, a flange ring, a central body, a first gasket, a second gasket, a split flange hub, a split flange ring and a band clamp.

18 Claims, 3 Drawing Sheets

CUT-IN FITTING FOR CONNECTING PIPE

FIELD OF THE INVENTION

This invention relates generally to pipe fittings, and, more specifically, to pipe fittings for insertion into existing runs of pipe.

BACKGROUND OF THE INVENTION

To make repairs or alterations to an existing pipe run, it is often necessary to insert into the pipe run a fitting. Inserting a pipe fitting into an existing pipe run is presently a time consuming operation. This is because fittings are most efficiently attached to pipe within the pipe run by attachment means requires a substantial amount of time to properly complete. The time lost in having to wait for proper attachment is a substantial problem where the inability to use the pipe run during the repairs or alterations adversely affects important plant operations.

Accordingly, there is a need for a method of inserting a fitting into an existing pipe run without requiring long down times awaiting attachment to be completed.

SUMMARY OF THE INVENTION

The invention satisfies this need. The invention is a unique cut-in fitting, a kit for assembling the cut-in fitting and a method of using the cut-in fitting. The cut-in fitting comprises:
  (a) a flange hub having a proximal end and a distal end, the distal end defining a flange hub shoulder;
  (b) a flange ring having a proximal side and a distal side, the distal side of the flange ring defining a flange hub shoulder seat sized and dimensioned to accept and retain the flange hub shoulder;
  (c) a central body having a proximal side and a distal side, the distal side of the central body defining a first gasket seat;
  (d) a first gasket, sized and dimensioned to be retained within the first gasket seat;
  (e) a second gasket sized and dimensioned to be retained between the distal side of the flange ring and the proximal side of the central body;
  (f) a split flange hub comprising at least two separate split flange hub portions, the at least two split flange hub portions defining a proximal split flange hub end and a distal split flange hub end, the distal split flange hub end defining a split flange hub shoulder;
  (g) a split flange ring comprising at least two separate split flange ring portions, the at least two split flange ring portions defining a proximal split flange ring side and a distal split flange ring side, the distal split flange ring side defining a split flange hub shoulder seat sized and dimensioned to accept and retain the split flange hub shoulder;
  (h) a band clamp sized and dimensioned to slip over the distal end of the split flange hub and being capable of being tightened against the distal end of the split flange hub; and
  (i) means for attaching the split flange ring, the central body and the flange ring to one another.

In the cut-in fitting of the invention, the split flange ring, the central body and the flange ring are attached to one another.

DRAWINGS

These and other features, aspects and advantages of the present invention will become better understood with reference to the following description, appended claims and accompanying drawings where:

DETAILED DESCRIPTION OF THE INVENTION

Figure 1:
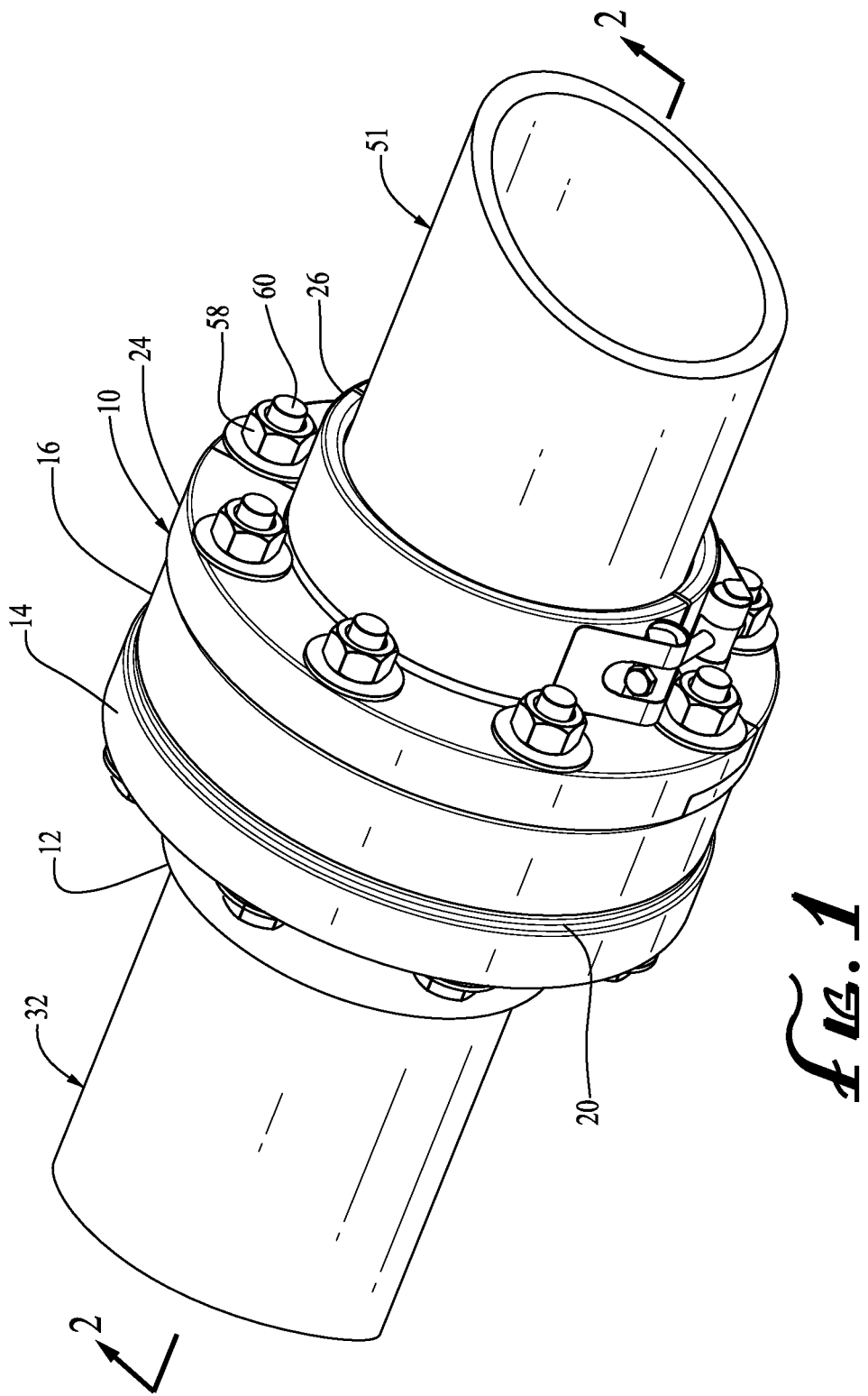
FIG. 1 is a perspective view of the cut-in fitting having features of the invention.
Figure 2:
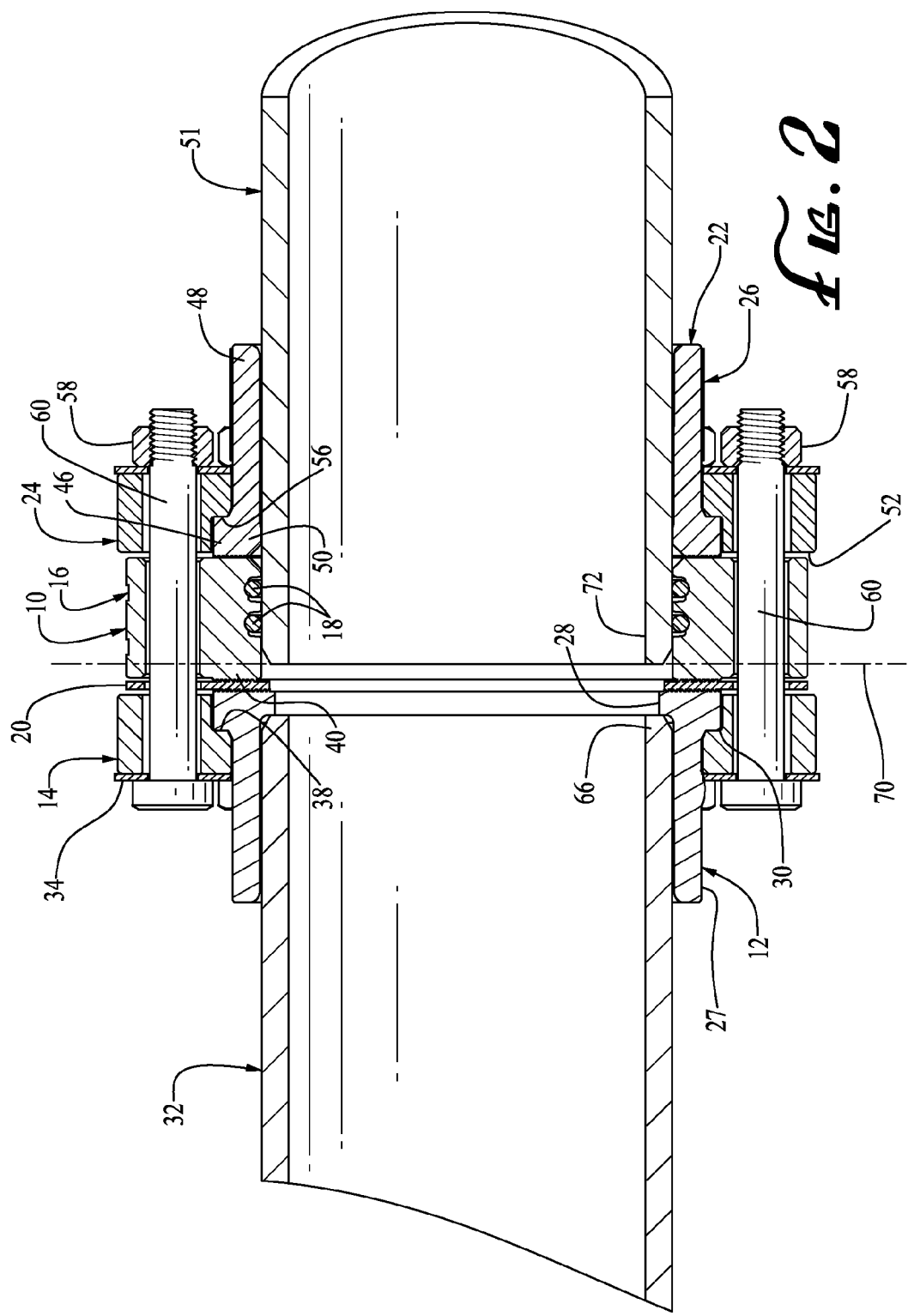
FIG. 2 is a cross sectional side view of the cut-in fitting illustrated in FIG. 1 taken along line 2-2.
Figure 3:
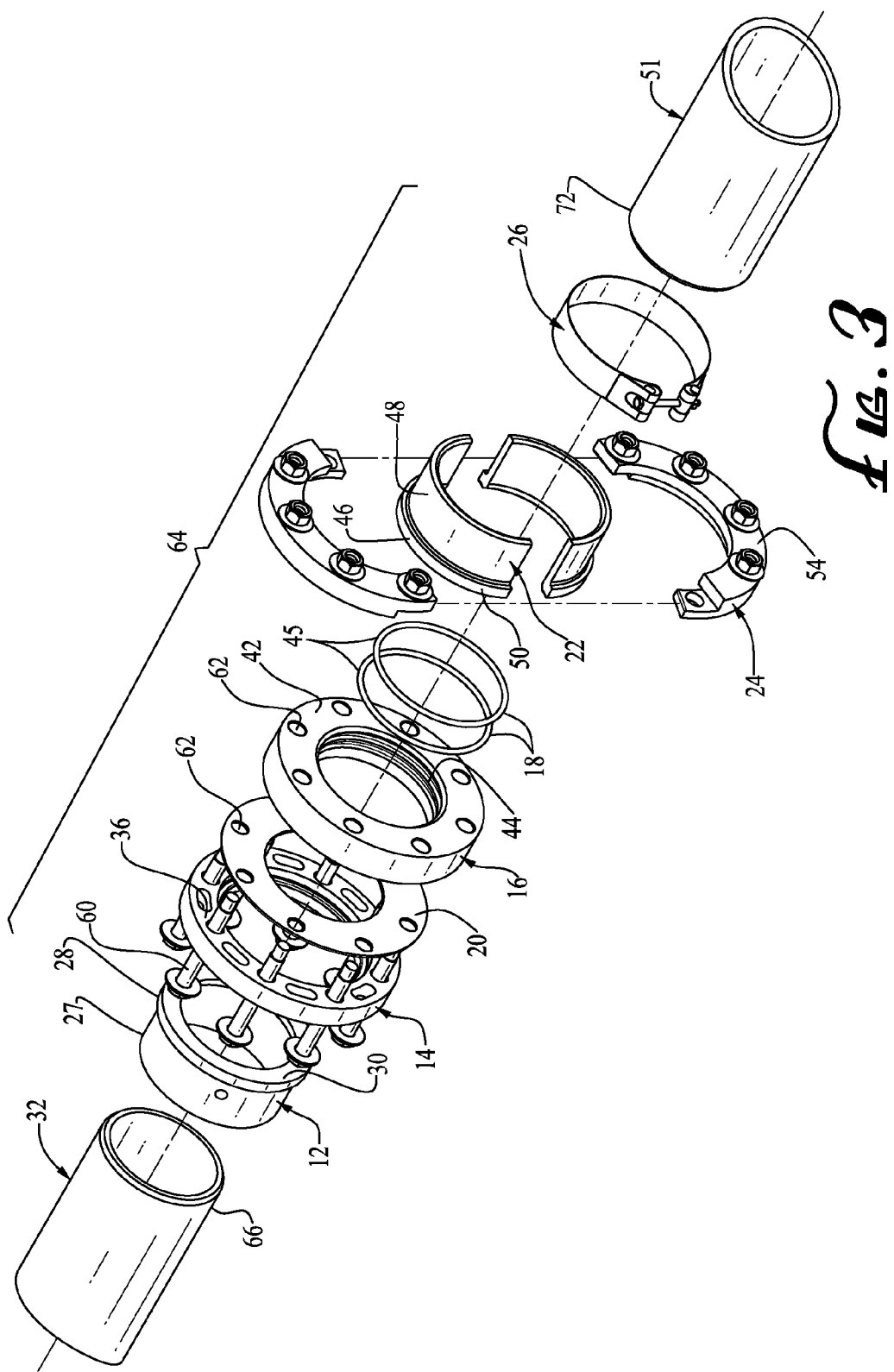
FIG. 3 is an exploded perspective view of a cut-in fitting illustrated in FIG. 1.

The following discussion describes in detail one embodiment of the invention and several variations of that embodiment. This discussion should not be construed, however, as limiting the invention to those particular embodiments. Practitioners skilled in the art will recognize numerous other embodiments as well.

One aspect of the invention is a cut-in fitting 10 comprising a flange hub 12, a flange ring 14, a central body 16, a first gasket 18, a second gasket 20, a split flange hub 22, a split flange ring 24 and a band clamp 26.

The flange hub 12 has a proximal end 27 and a distal end 28. The distal end 28 defines a flange hub shoulder 30. The purpose of the flange hub 12 is to allow the cut-in fitting 10 to be attached to a new length of pipe 32, so the interior surface of the flange hub 12 is sized and dimensioned to match the exterior surface of a typical pipe. Since most pipe has a circular cross section, the flange hub 12 typically has a circular cross section. Where the flange hub 12 is circular in cross section, the flange hub shoulder 30 has a diameter which is larger than the diameter of the flange hub 12.

The flange ring 14 has a proximal side 34 and a distal side 36. The distal side 36 of the flange ring 14 defines a flange hub shoulder seat 38 which is sized and dimensioned to accept and retain the flange hub shoulder 30.

The central body 16 has a proximal side 40 and a distal side 42. The interior surface of the central body 16 defines a first gasket seat 44. The first gasket 18 is sized and dimensioned to be retained within the first gasket seat 44. As illustrated in the drawings, the first gasket 18 is typically an o-ring 45. In the embodiment illustrated in the drawings, the first gasket 18 comprises a pair of o-rings 45.

The second gasket 20 is sized and dimensioned to be retained between the distal side 36 of the flange ring 14 and the proximal side 40 of the central body 16. Typically, the second gasket 20 is a flat gasket made from rubber, EPDM, neoprene or similar material.

The split flange hub 22 comprises at least two split flange hub portions. The at least two split flange hub portions define a proximal split flange hub end 46 and a distal split flange hub end 48. The distal split flange hub end 48 defines a split flange hub shoulder 50. The purpose of the split flange hub 22 is to allow the cut-in fitting 10 to be attached to an existing pipe run 51 without cutting into the pipe run 51. For this reason, the split flange hub comprises at least two split flange hub portions. As illustrated in the drawings, the at least two split flange hub portions are capable of being assembled to one another to create a single continuous split flange hub 22.

The split flange ring 24 comprises at least two separate split flange ring portions. The purpose of the split flange ring 24 is also to attach the cut-in fitting 10 to the existing pipe 51 run without cutting into the pipe run 51. As illustrated in the drawings, the at least two split flange ring portions are capable of being assembled to one another to form a continuous split flange ring 24. The at least two split flange ring portions define a proximal split flange ring side 52 and a distal split flange ring side 54. The distal split flange ring side 54 defines a split flange hub shoulder seat 56 which is sized and dimensioned to accept and retain the split flange hub shoulder 50.

The band clamp 26 is sized and dimensioned to slip over the distal split flange hub end 48 and is capable of being tightened against the distal split flange hub end 48. The purpose of the band clamp 26 is to clamp the split flange ring 24 to the split flange hub 22. Accordingly, the band clamp 26 has interior dimensions which allow the band clamp 26 to be slipped over the split flange hub 22 and then clamped down tightly against the split flange hub 22.

In the cut-in fitting 10, the split flange ring 24, the central body 16 and the flange ring 14 are attached to one another by attachment means, typically comprised of nuts 58 and bolts 60. As illustrated in the drawings, it is typical for the flange ring 14, central body 16, the second gasket 20 and the split flange ring 24 to define matching bolt holes 62 to facilitate the attachment of the flange ring 14, central body 16 and split flange ring 24 to one another.

The components of the cut-in fitting 10 can be made from a wide variety of materials, including, but not limited to, metal alloys (such as weldable steel and aluminum) and thermoplastics (such as PVC and CPVC).

A second aspect of the invention is a kit 64 for assembling the cut-in fitting 10. The kit 64 comprises the flange hub 12, the flange ring 14, the central body 16, the first gasket 18, the second gasket 20, the split flange hub 22, the split flange ring 24 and the band clamp 26.

A third aspect of the invention is a method for using the cut-in fitting 10 to connect a first thermoplastic pipe end 66 into a pipe run 51 to facilitate the repair or modification of the pipe run 51. The method comprises the steps of:
 (a) providing the cut-in fitting kit 64;
 (b) placing the flange ring 14 around the distal end 28 of the flange hub 12 and attaching the flange hub 12 to the first pipe end 66;
 (c) determining a connection location 70 within the pipe run 51 where the first pipe end 66 is to be connected to the pipe run 51 and defining a second pipe end 72 to which the first pipe end 66 is to be connected at the connection location 70;
 (d) placing the split flange ring 24 and the band clamp 26 around the distal split flange hub end 48 and attaching the split flange hub 22 to the second pipe end 72;
 (e) tightening of the band clamp 26 to the distal end 48 of the split flange hub 22;
 (f) after attachment of the flange hub 12 to the first pipe end 66 and attachment of the split flange hub 22 to the second pipe end 72 are complete, cutting into the pipe run 51 at the connection location 70 to form the second pipe end 72;
 (g) placing the first gasket 18 within the first gasket seat 44 and placing the second gasket 20 between the flange ring 14 and the central body 16; and
 (h) attaching the split flange ring 24, the central body 16 and the flange ring 14 to one another.

The attachment of the flange hub 12 to the first pipe end 66 and attachment of the split flange hub 22 to the second pipe end 72 can be made by a wide variety of attachment methods depending on the materials involved, especially depending on the materials of the flange hub 12, the first pipe end 66, the split flange hub 22 and the second pipe end 72. Such attachment methods include, but are not limited to, stick welding, wire welding, TIG welding, brazing, soldering, solvent welding and use of adhesives (such as epoxy adhesives and urethane adhesives).

The invention provides a device and method for inserting a fitting into an existing pipe run without requiring a long down time waiting for attachments to be completed. The unique cut-in fitting of the invention allows required attachments to be fully and properly completed before the existing pipe run is shut down, depressurized and cut into. Once the existing pipe run is cut into, the connection of the existing pipe run to a new run of pipe is quickly and efficiently accomplished by assembly with the cut-in fitting—typically in a matter of minutes.

The invention is especially advantageous in making repairs or alterations to an existing thermoplastic pipe run, where it is often necessary to insert into the pipe run a thermoplastic fitting. Inserting a thermoplastic pipe fitting into an existing thermoplastic pipe run is a time consuming operation. This is because thermoplastic fittings are often most efficiently attached to thermoplastic pipe by solvent welding. Solvent welding requires a substantial amount of time for the weld to properly cure. The time lost in having to wait for solvent welds to cure is a substantial problem.

Where the pipe run 51 is made of thermoplastic, the method of the invention comprises the steps of:
 (a) providing the cut-in fitting kit 64, wherein both the flange hub 12 and the split flange hub 66 are made of a thermoplastic material;
 (b) placing the flange ring 14 around the distal end 28 of the flange hub 12 and attaching the flange hub 12 to the first pipe end 66 by a first solvent weld;
 (c) determining a connection location 70 within the pipe run 51 where the first pipe end 66 is to be connected to the pipe run 51 and defining a second pipe end 72 to which the first pipe end 66 is to be connected at the connection location 70;
 (d) placing the split flange ring 24 and the band clamp 26 around the distal split flange hub end 48 and attaching the split flange hub 22 to the second pipe end 72 by a second solvent weld;
 (e) tightening of the band clamp 26 to the distal end 54 of the split flange hub 22;
 (f) after the first and second solvent welds have cured, cutting into the pipe run 51 at the connection location 70 to form the second pipe end 72;
 (g) placing the first gasket 18 within the first gasket seat 44 and placing the second gasket 20 between the flange ring 14 and the central body 16; and
 (h) attaching the split flange ring 24, the central body 16 and the flange ring 14 to one another.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A cut-in fitting kit for joining one or more pipes that do not have flanges, the kit comprising:
 (a) a flange hub having a proximal end and a distal end, the distal end defining a flange hub shoulder;
 (b) a flange ring having a proximal side and a distal side, the distal side of the flange ring defining a flange hub shoulder seat sized and dimensioned to accept and retain the flange hub shoulder;
 (c) a central body having a proximal side, a distal side, and an interior surface, the interior surface of the central body defining a first gasket seat;
 (d) a first gasket disposed within the first gasket seat;

(e) a second gasket sized and dimensioned to be retained between the distal side of the flange ring and the proximal side of the central body;
(f) a split flange hub comprising at least two separate split flange hub portions, the at least two split flange hub portions defining a proximal split flange hub end and a distal split flange hub end, the distal split flange hub end defining a split flange hub shoulder;
(g) a split flange ring comprising at least two separate split flange ring portions, the at least two split flange ring portions defining a proximal split flange ring side and a distal split flange ring side, the distal split flange ring side defining a split flange hub shoulder seat sized and dimensioned to accept and retain the split flange hub shoulder;
(h) a band clamp sized and dimensioned to slip over the distal end of the split flange hub and being capable of being tightened against the distal end of the split flange hub; and
(i) means for attaching the split flange ring, the central body and the flange ring to one another.

2. The cut-in fitting of claim 1, wherein the second gasket comprises an o-ring.

3. The cut-in fitting of claim 1, wherein the second gasket comprises a pair of o-rings.

4. A cut-in fitting for joining one or more pipes that do not have flanges, the fitting comprising:
(a) a flange hub having a proximal end and a distal end, the distal end defining a flange hub shoulder;
(b) a flange ring disposed around the distal end of the flange hub, the flange ring having a proximal side and a distal side, the distal side of the flange ring defining a flange hub shoulder seat sized and dimensioned to accept and retain the flange hub shoulder;
(c) a central body having a proximal side, a distal side, and an interior surface, the proximal side of the central body being disposed proximate to the distal side of the flange ring, the interior surface of the central body defining a first gasket seat;
(d) a first gasket, disposed within the first gasket seat;
(e) a second gasket retained between the distal side of the flange ring and the proximal side of the central body;
(f) a split flange hub comprising at least two separate split flange hub portions, the at least two split flange hub portions defining a proximal split flange hub end and a distal split flange hub end, the distal split flange hub end defining a split flange hub shoulder;
(g) a split flange ring disposed around the distal end of the split flange hub, the split flange ring comprising at least two separate split flange ring portions, the at least two split flange ring portions defining a proximal split flange ring side and a distal split flange ring side, the distal split flange ring side defining a split flange hub shoulder seat sized and dimensioned to accept and retain the split flange hub shoulder; and
(h) a band clamp disposed over the distal end of the split flange hub and tightened against the distal end of the split flange hub;
wherein the split flange ring, the central body and the flange ring are attached to one another.

5. The cut-in fitting of claim 4, wherein the second gasket comprises an o-ring.

6. The cut-in fitting of claim 4, wherein the second gasket comprises a pair of o-rings.

7. A method of rapidly connecting a first pipe end into a pipe run to facilitate the repair or modification of the pipe run, the first pipe end having an outer surface and the pipe run having an outer surface, the method comprising the steps of:
(a) providing a cut-in fitting kit comprising:
(i) a flange hub having a proximal end, a distal end and an inner surface, the distal end defining a flange hub shoulder and a distal end, the distal end defining a flange hub shoulder and the inner surface being sized and dimensioned to match the outer surface of the first pipe end;
(ii) a flange ring having a proximal side and a distal side, the distal side of the flange ring defining a flange hub shoulder seat sized and dimensioned to accept and retain the flange hub shoulder;
(iii) a central body having a proximal side, a distal side, and an interior surface, the interior surface of the central body defining a first gasket seat;
(iv) a first gasket disposed within the first gasket seat;
(v) a second gasket sized and dimensioned to be retained between the distal side of the flange ring and the proximal side of the central body;
(vi) a split flange hub comprising at least two separate split flange hub portions, the at least two split flange hub portions defining a proximal split flange hub end, a distal split flange hub end and an inner surface, the distal split flange hub end defining a split flange hub shoulder and the inner surface of the split flange hub being sized and dimensioned to match the outer surface of the pipe run;
(vii) a split flange ring comprising at least two separate split flange ring portions, the at least two split flange ring portions defining a proximal split flange ring side and a distal split flange ring side, the distal split flange ring side defining a split flange hub shoulder seat sized and dimensioned to accept and retain the split flange hub shoulder;
(viii) a band clamp sized and dimensioned to slip over the distal end of the split flange hub and being capable of being tightened against the distal end of the split flange hub; and
(ix) means for attaching the split flange ring, the central body and the flange ring to one another;
(b) placing the flange ring around the distal end of the flange hub and attaching the flange hub to the first pipe end;
(c) determining a connection location within the pipe run where the first pipe end is to be connected to the pipe run and defining a second pipe end to which the first pipe end is to be connected at the connection location;
(d) placing the split flange ring and the band clamp around the distal end of the split flange hub and attaching the split flange hub to the second pipe end;
(e) tightening of the band clamp to the distal end of the split flange hub;
(f) after attachment of the flange hub to the first pipe end and attachment of the split flange hub to the second pipe end are complete, cutting into the pipe run at the connection location to form the second pipe end;
(g) placing the first gasket within the first gasket seat and placing the second gasket between the flange ring and the central body; and
(h) attaching the split flange ring, the central body and the flange ring to one another.

8. The cut-in fitting of claim 7, wherein the second gasket comprises an o-ring.

9. The cut-in fitting of claim 7, wherein the second gasket comprises a pair of o-rings.

10. A cut-in fitting kit for joining one or more pipes that do not have flanges, the cut-in fitting kit comprising:
   (a) a thermoplastic flange hub having a proximal end and a distal end, the distal end defining a flange hub shoulder;
   (b) a flange ring having a proximal side and a distal side, the distal side of the flange ring defining a flange hub shoulder seat sized and dimensioned to accept and retain the flange hub shoulder;
   (c) a central body having a proximal side, a distal side, and an interior surface, the interior surface of the central body defining a first gasket seat;
   (d) a first gasket, disposed within the first gasket seat;
   (e) a second gasket sized and dimensioned to be retained between the distal side of the flange ring and the proximal side of the central body;
   (f) a thermoplastic split flange hub comprising at least two separate split flange hub portions, the at least two split flange hub portions defining a proximal split flange hub end and a distal split flange hub end, the distal split flange hub end defining a split flange hub shoulder;
   (g) a split flange ring comprising at least two separate split flange ring portions, the at least two split flange ring portions defining a proximal split flange ring side and a distal split flange ring side, the distal split flange ring side defining a split flange hub shoulder seat sized and dimensioned to accept and retain the split flange hub shoulder;
   (h) a band clamp sized and dimensioned to slip over the distal end of the split flange hub and being capable of being tightened against the distal end of the split flange hub; and
   (i) means for attaching the split flange ring, the central body and the flange ring to one another.

11. The cut-in fitting of claim 10, wherein the second gasket comprises an o-ring.

12. The cut-in fitting of claim 10, wherein the second gasket comprises a pair of o-rings.

13. A cut-in fitting for joining one or more pipes that do not have flanges, the cut-in fitting comprising:
   (a) a thermoplastic flange hub having a proximal end and a distal end, the distal end defining a flange hub shoulder;
   (b) a flange ring disposed around the distal end of the flange hub, the flange ring having a proximal side and a distal side, the distal side of the flange ring defining a flange hub shoulder seat sized and dimensioned to accept and retain the flange hub shoulder;
   (c) a central body having a proximal side, a distal side, and an interior surface, the proximal side of the central body being disposed proximate to the distal side of the flange ring, the interior surface of the central body defining a first gasket seat;
   (d) a first gasket, disposed within the first gasket seat;
   (e) a second gasket retained between the distal side of the flange ring and the proximal side of the central body;
   (f) a thermoplastic split flange hub comprising at least two separate split flange hub portions, the at least two split flange hub portions defining a proximal split flange hub end and a distal split flange hub end, the distal split flange hub end defining a split flange hub shoulder;
   (g) a split flange ring disposed around the distal end of the split flange hub, the split flange ring comprising at least two separate split flange ring portions, the at least two split flange ring portions defining a proximal split flange ring side and a distal split flange ring side, the distal split flange ring side defining a split flange hub shoulder seat sized and dimensioned to accept and retain the split flange hub shoulder; and
   (h) a band clamp disposed over the distal end of the split flange hub and tightened against the distal end of the split flange hub;
   wherein the split flange ring, the central body and the flange ring are attached to one another.

14. The cut-in fitting of claim 13, wherein the second gasket comprises an o-ring.

15. The cut-in fitting of claim 13, wherein the second gasket comprises a pair of o-rings.

16. A method of rapidly connecting a first thermoplastic pipe end into a thermoplastic pipe run to facilitate the repair or modification of the pipe run, the first pipe end having an outer surface and the pipe run having an outer surface, the method comprising the steps of:
   (a) providing a cut-in fitting kit comprising:
      (i) a thermoplastic flange hub having a proximal end, a distal end and an inner surface, the distal end defining a flange hub shoulder and a distal end, the distal end defining a flange hub shoulder and the inner surface being sized and dimensioned to match the outer surface of the first pipe end;
      (ii) a flange ring having a proximal side and a distal side, the distal side of the flange ring defining a flange hub shoulder seat sized and dimensioned to accept and retain the flange hub shoulder;
      (iii) a central body having a proximal side, a distal side, and an interior surface, the interior surface of the central body defining a first gasket seat;
      (iv) a first gasket disposed within the first gasket seat;
      (v) a second gasket sized and dimensioned to be retained between the distal side of the flange ring and the proximal side of the central body;
      (vi) a thermoplastic split flange hub comprising at least two separate split flange hub portions, the at least two split flange hub portions defining a proximal split flange hub end, a distal split flange hub end and an inner surface, the distal split flange hub end defining a split flange hub shoulder and the inner surface of the split flange hub being sized and dimensioned to match the outer surface of the pipe run;
      (vii) a split flange ring comprising at least two separate split flange ring portions, the at least two split flange ring portions defining a proximal split flange ring side and a distal split flange ring side, the distal split flange ring side defining a split flange hub shoulder seat sized and dimensioned to accept and retain the split flange hub shoulder;
      (viii) a band clamp sized and dimensioned to slip over the distal end of the split flange hub and being capable of being tightened against the distal end of the split flange hub; and
      (ix) means for attaching the split flange ring, the central body and the flange ring to one another;
   (b) placing the flange ring around the distal end of the flange hub and attaching the flange hub to the first pipe end by a first solvent weld;
   (c) determining a connection location within the pipe run where the first pipe end is to be connected to the pipe run and defining a second pipe end to which the first pipe end is to be connected at the connection location;
   (d) placing the split flange ring and the band clamp around the distal end of the split flange hub and attaching the split flange hub to the second pipe end by a second solvent weld;

(e) tightening of the band clamp to the distal end of the split flange hub;
(f) after the first and second solvent welds have cured, cutting into the pipe run at the connection location to form the second pipe end;
(g) placing the first gasket within the first gasket seat and placing the second gasket between the flange ring and the central body; and
(h) attaching the split flange ring, the central body and the flange ring to one another.

17. The cut-in fitting of claim 16, wherein the second gasket comprises an o-ring.

18. The cut-in fitting of claim 16, wherein the second gasket comprises a pair of o-rings.

\* \* \* \* \*